UNITED STATES PATENT OFFICE.

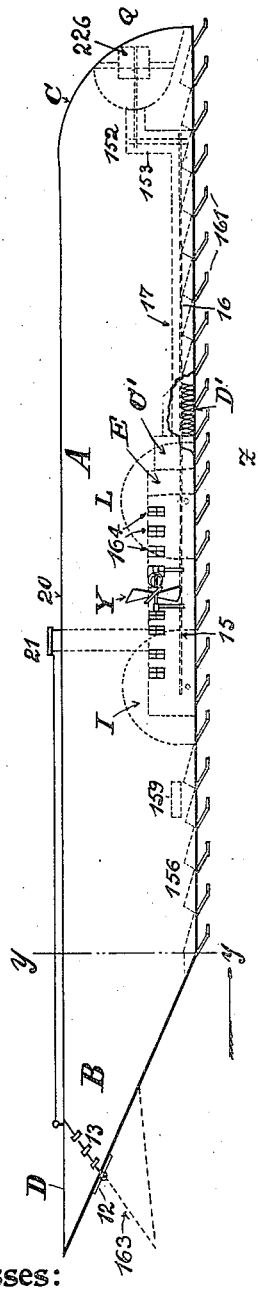

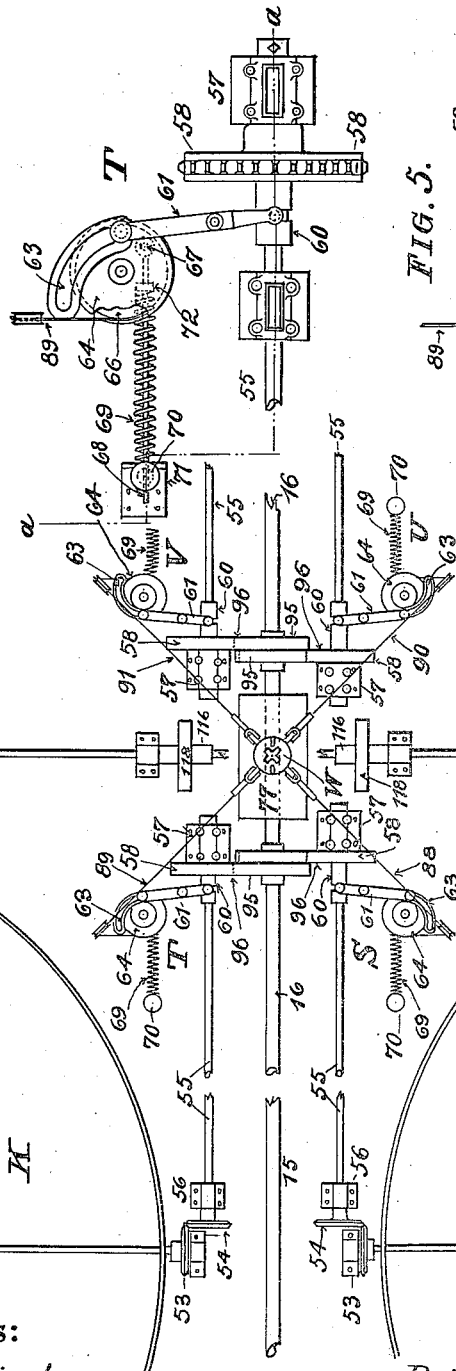

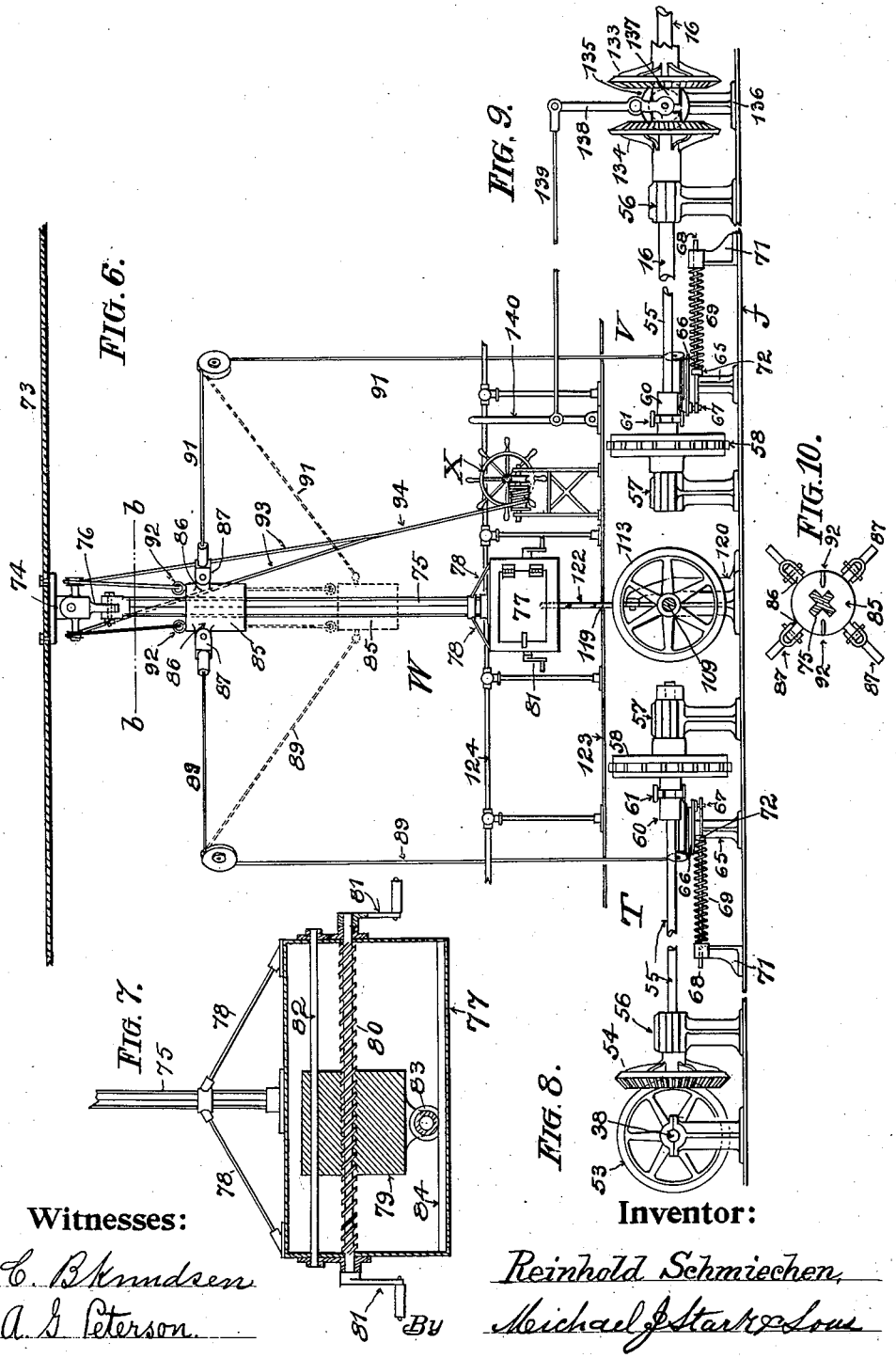

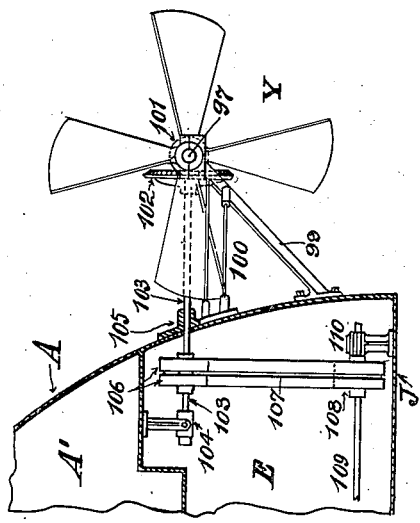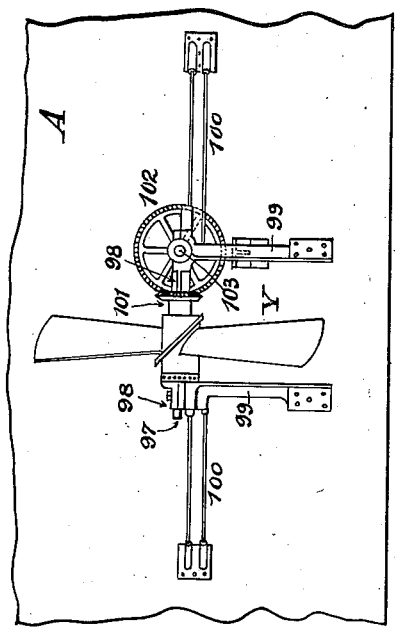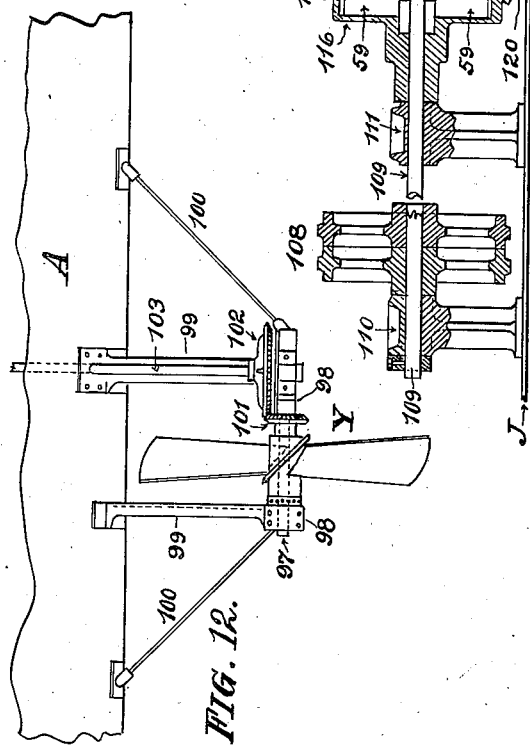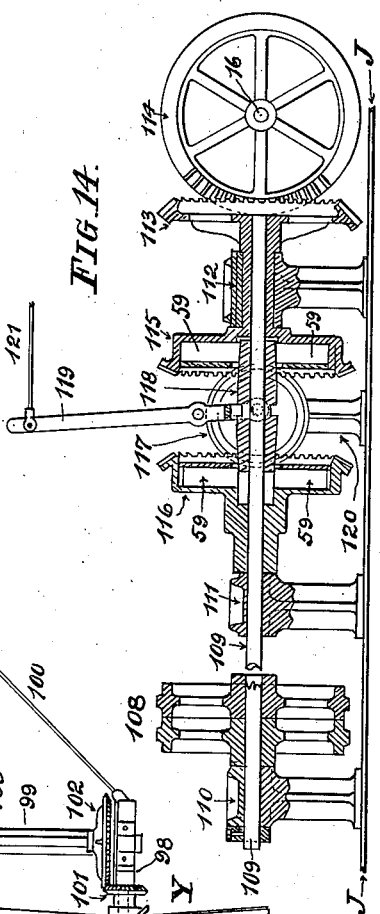

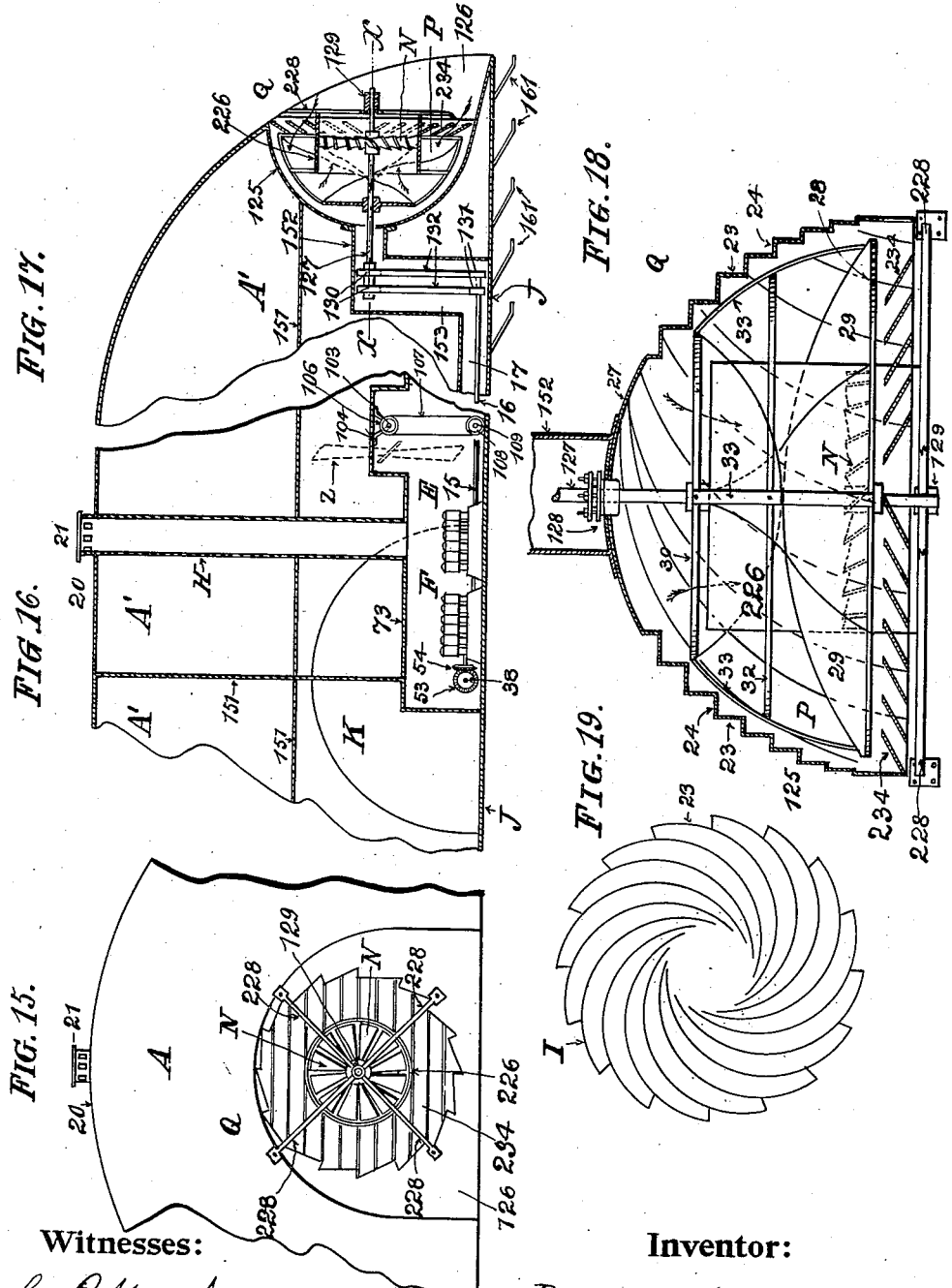

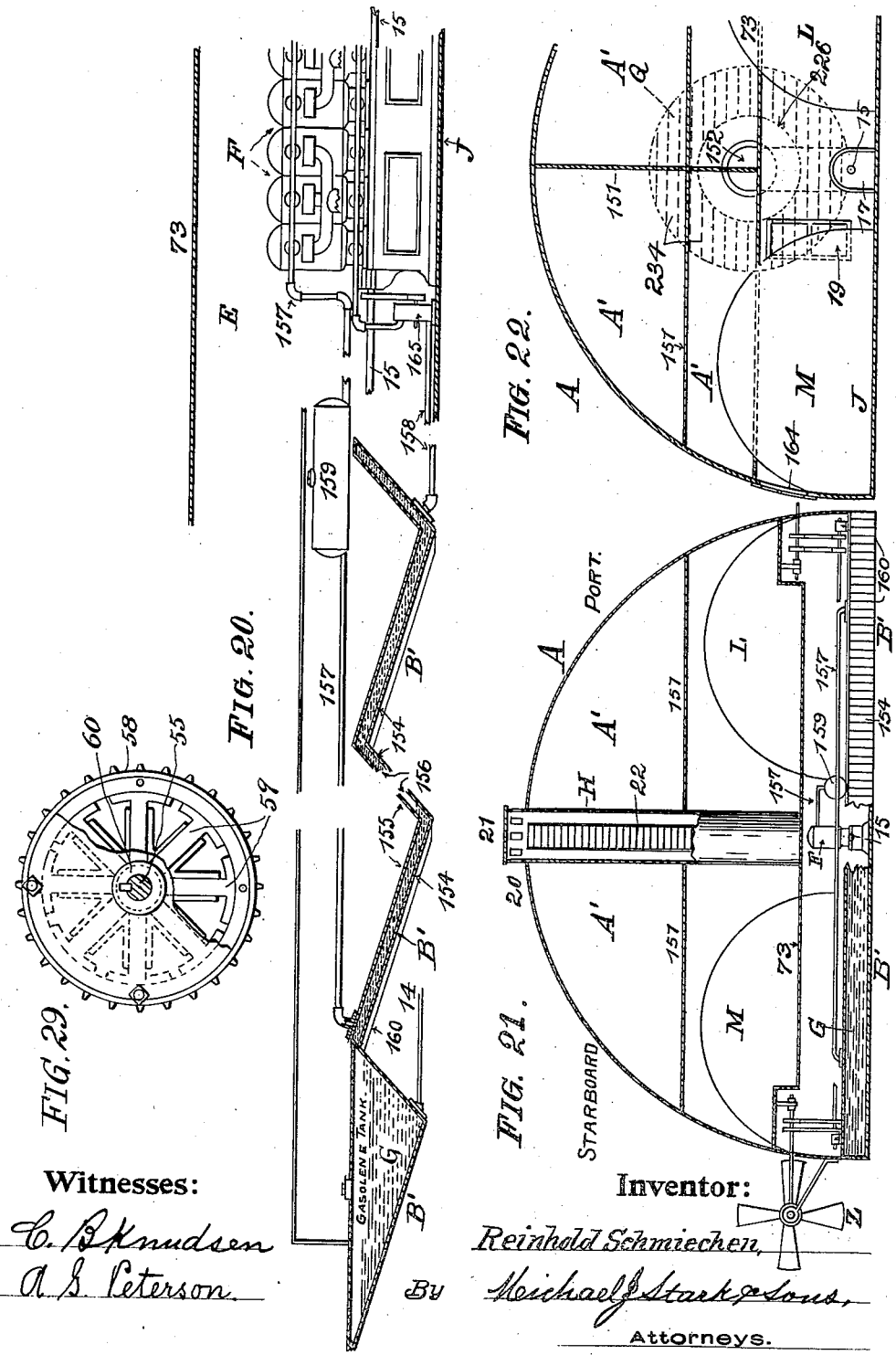

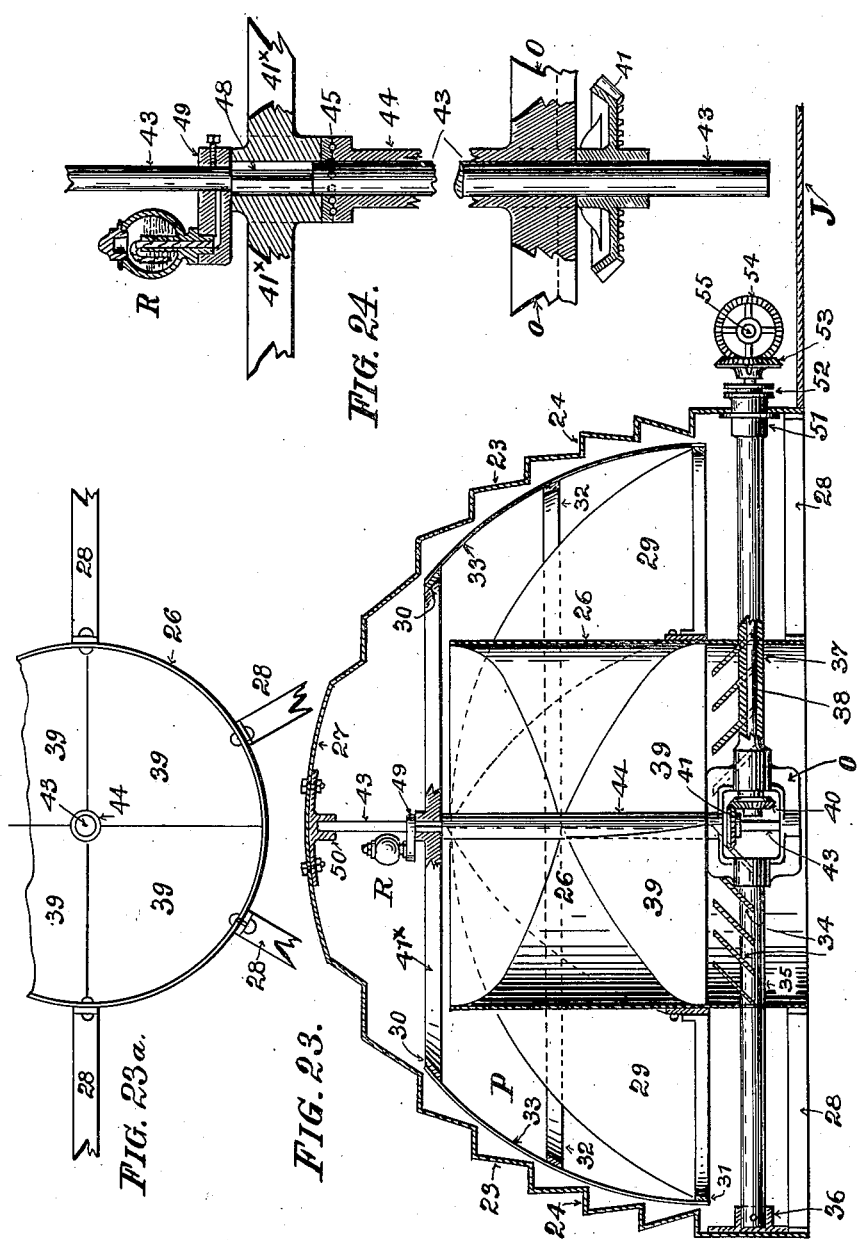
R. SCHMIECHEN.
OCEAN AIRSHIP.
APPLICATION FILED AUG. 12, 1909.
977,555.
Patented Dec. 6, 1910.
8 SHEETS—SHEET 7.

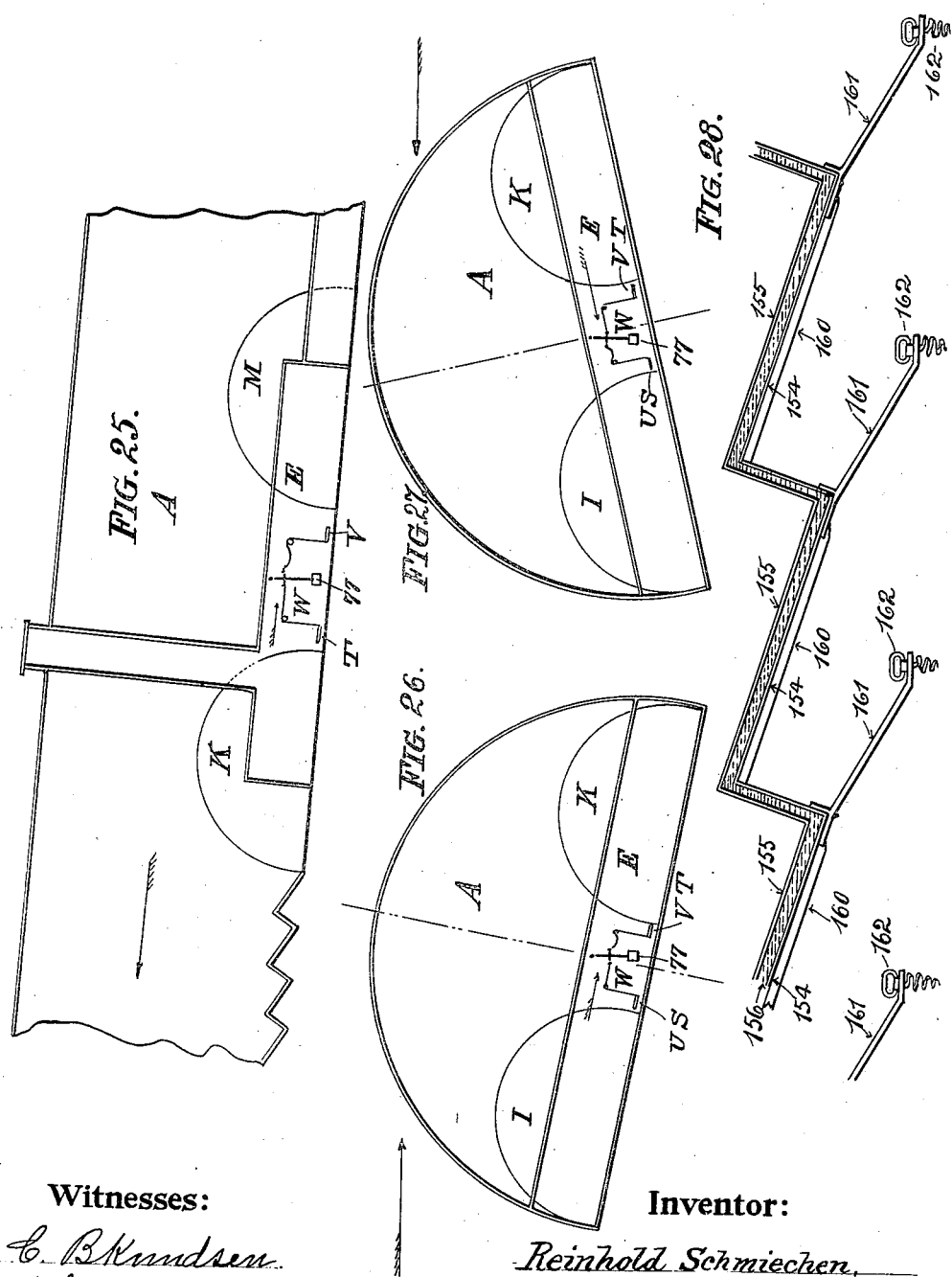

REINHOLD SCHMIECHEN, OF LEDYARD, IOWA.

OCEAN-AIRSHIP.

977,555.  Specification of Letters Patent.  Patented Dec. 6, 1910.

Application filed August 12, 1909. Serial No. 512,556.

*To all whom it may concern:*

Be it known that I, REINHOLD SCHMIECHEN, a citizen of the United States, and resident of Ledyard, in the county of Kossuth and State of Iowa, have invented certain new and useful Improvements in Ocean-Airships; and I do hereby declare that the following description of my said invention, taken in connection with the accompanying sheets of drawings, forms a full, clear, and exact specification, which will enable others skilled in the art to which it appertains to make and use the same.

This invention has general reference to ocean-airships, or airships adapted to float and move upon water as well as in air; and it consists, essentially, in the novel and peculiar combination of parts and details of constructions, as hereinafter first fully set forth and described and then pointed out in the claims.

The object of this invention is the production of an ocean-airship which shall possess the following advantages and produce the results stated:

1. An ocean-airship which shall be capable of carrying heavier loads than has heretofore been attained, for the reason that it includes two lifting and propelling mediums, viz., a gas, lighter than air contained in a body consisting of a series of cells, and propelling and lifting mechanism.

2. An ocean-airship adapted to reach higher altitudes and to travel longer distances than aeroplanes.

3. An ocean-airship which is capable of rising vertically in the air, or vertically out of water.

4. An ocean-airship that needs no ballast to cause it to rise by discharging the same, for the reason that it is capable of rising by virtue of its propelling mechanism.

5. An ocean-airship that can be lowered vertically by reducing the speed of the propelling and lifting mechanism without discharging gas from the cells.

6. An ocean-airship which is capable of moving horizontally or in inclined planes either forward or backward by manipulating its propelling and vertically moving means in the proper direction.

7. An ocean-airship that can be turned in a horizontal plane at any particular point by operating the propelling mechanism on one side of the ship in opposite direction to that of the propelling mechanism on the other side of said ship.

8. An ocean-airship that can be maintained at any particular position by manipulating the vertically-lifting mechanism and regulating the speed of the forwardly-propelling mechanism to resist the influence of air-currents.

9. An ocean-airship having sufficient mechanical means to lift the heavier-than-air ship without the use of gas in its cells.

10. An ocean-airship that can move horizontally with the speed of a storm when the mechanical means for propelling the ship are being all utilized for forward propulsion only, the aeroplanes under the body of the ship being sufficient to maintain the ship at whatever elevation it may be moving.

11. An ocean-airship that cannot drop with considerable speed for the reasons that: *a*, it is not depending upon the superior skill of an operator for directing it; *b*, since by failure of any one of the motors the remaining ones are sufficient to maintain the ship afloat and to propel the same at a reduced speed, and *c*, should one or more of the gas-containing cells be punctured and the gas therein have escaped, the vertically-lifting means are ample to maintain the ship in air, or to cause but a slow descending thereof; *d*, the ship, owing to the large volume of gas contained in its gas-cells; *e*, and the large area of the bottom of the ship which offers sufficient resistance to the rapid descending of the ship; *f*, on account of the hemispherical contour of the casings surrounding the fan-wheels which together with, *g*, the space below the bottom of the ship, which is inclosed at its sides and rear by the downwardly-projecting longitudinal walls of the ship's body, act as a parachute and retard the downward movement of the ship.

12. An ocean-airship which is capable of moving in water in any desired direction on account of the introduction of side and stern-propellers which are operated independently of the vertically-lifting means, and which can be rotated to move the ship in water either forward, backward or turn it in any direction, and that can be moved in water at such a speed that the inclined planes below the bottom thereof will cause it to rise nearly to the surface thereof, so that when the vertically-lifting fans are operated, the ship will 13. Rise vertically out of the water into the air.

14. An ocean-airship which is more bullet-proof than an aeroplane for the reason that it is capable of rising higher in the air and be practically out of reach of bullets, and in which the operators and passengers are not directly exposed to such bullets.

15. An ocean-airship in which the passengers and the crew are protected from the inclemencies of the weather, whether anchored at rest or moving in air or upon water.

16. An ocean-airship in which the motors are protected from the cold atmosphere by being located in an inclosure which is heateted by the heat radiated from said motors.

17. An ocean-airship which in a storm can be securely anchored on land, and which is so shaped that the effects of a storm tend to press the ship down upon the ground, where the ship may be securely fastened by suitable anchors and thus prevented from being lifted by the storm.

18. An ocean-airship which, owing to its being able to move without gas in its gas-cells, needs not be taken apart and loaded upon wagons to transport it from place to place, nor is it necessary that gas in storage-cylinders or liquid fuel in tanks be carried after the ship to supply any deficiency.

19. An ocean-airship which may be made as large as the largest ocean steam-ship, and its hull constructed of pressed steel, whereby the loss of gas from the gas-cells therein is minimized, and which ocean-air ship requires no building within which it may be housed when not in use.

20. An airship capable of automatically maintaining its equilibrium when afloat in air and, 21. An ocean-airship which possesses two independent means for propelling the ship forward and backward when afloat in air or in water.

In order to attain these desirable results, I construct this ocean-airship as shown in the drawings already referred to, in which—

Figure 1 is a side-elevation of the machine. Fig. 2 is a longitudinal sectional elevation of the amid-ship portion thereof. Fig. 3 is a diagrammatic plan of the operating machinery and the means for automatically maintaining the ship upon an even keel. Fig. 4 is a plan of one of the friction-clutches by means of which the vertical air-propellers are operated and by which the ship is also kept in equilibrium. Fig. 5 is a longitudinal sectional elevation on line $a$ $a$ of Fig. 4. Fig. 6 is an elevation of the operating mechanism located on the starboard side of the air ship. Fig. 7 is a sectional view of a portion of the pendulum and the means included therein for maintaining the equilibrium of the ship. Fig. 8 is an elevation of a portion of the gearing by which the vertically-propelling-mechanism is operated, and Fig. 9 is a similar view of the reversing-gear which operates the propeller located at the stern of the airship. Fig. 10 is a plan of the intermediary which connects the pendulum with the friction-clutches that operate the vertically-lifting mechanism. Fig. 11 is an elevation illustrating one of the side-propellers. Fig. 12 is a plan of the same. Fig. 13 is an end-elevation thereof, a fragment of the ship's body being shown in section. Fig. 14 is a sectional view of the clutch-mechanism by means of which the side-propellers are rotated, stopped and reversed. Fig. 15 is a rear-elevation of a portion of the airship. Fig. 16 is a longitudinal sectional elevation of a fragment of the air-ship, illustrating details of the mechanism for operating the vertically-lifting mechanism and the side-propellers, and Fig. 17 is a similar view illustrating details of construction of the stern propeller. Fig. 18 is a sectional plan on line $x$ $x$ of Fig. 17. Fig. 19 is a plan of one of the hemispherical shells within which the vertically-lifting mechanism is located. Fig. 20 is a longitudinal sectional elevation of a fragment of the air-ship, illustrating the aeroplanes and the water-cooling, and the gasolene tanks located therein, a portion of the internal combustion-engines being shown in outline-elevation. Fig. 21 is a transverse-sectional elevation on line $y$ $y$ of Fig. 1. Fig. 22 is a similar view taken on line $z$ $z$ of Fig. 2. Fig. 23 is a transverse-sectional elevation of one of the hemispherical shells and the vertically-lifting cyclone-producers. Fig. 23$^a$ is a plan of a portion of the cylinder in the vertically-lifting device, and illustrating the means for supporting the cylinder in said shell. Fig. 24 is a sectional elevation of the central shaft which revolves the fans located in said hemispherical shells. Figs. 25, 26, and 27 are diagrammatic views and illustrating the airship in various inclined positions, and the means for righting the same, or bringing it upon an even keel. Fig. 28 is a sectional view of a portion of the water-cooler, and the legs upon which the ship is supported when anchored upon ground. Fig. 29 is a face-view of one of the friction sprocket wheels shown in Fig. 5, portion of the coverplate thereof being broken away to disclose the friction-bars.

Like parts are designated by corresponding symbols and characters in all the various figures.

A in these drawings designates the ship's body. It is approximately semi-circular in transverse section, its bow B being pointed and its stern C rounded, as clearly shown in Fig. 1, and also in several of the other figures. The bow of this body terminates in a head D, which is suitably hinged to said bow at 12, and provided with proper fastenings 13, by means of which the head D may be temporarily secured to the bow, said head being adapted to be swung underneath the bow B as shown in dotted lines in Fig. 1, the object of which will hereinafter more fully appear. Within this body there is provided a space, E, being the engine-room within which the entire mechanism for propelling the ship, is located. This mechanism includes a multiplicity of internal-combustion engines F of the latest improved construction, said engines being of the gasolene-consuming type, the liquid fuel for said engines being contained in a tank G, Fig. 20, from which suitable piping 14, conveys the liquid fuel to said engines, there being several of these motors installed so that the danger of inoperativeness of the propelling power is minimized. The engine-shaft 15 of these motors is suitably coupled to a main power transmission shaft 16, which shaft passes from the engine room to near the stern of the ship and it is located very low therein, so as to bring the center of gravity of the ship as low as possible. It is inclosed in a tube, or tunnel 17, Figs. 2, 17, and 22, of a size large enough in diameter to permit passage therethrough of a workman, whenever such should become necessary, the main transmission shaft 16 being inclosed in said tube to permit passage through the gas-cells located in the ship's body, and to prevent water from entering the engine-room when the ship is afloat upon water. The rear-end of the engine room is closed by a wall or transverse bulk-head 18, wherein said tunnel or tube 17 terminates, it being understood that all the walls of the engine-room are water and gas-tight structures, for obvious reasons, there being a door 19, in the bulk-head 18 which is so constructed that it may be closed air tight when necessary, and through which access is had to the interior of the ship. From this engine-room E there leads a shaft H, upwardly, and through the crown-wall 20 of the airship, into an observation room 21, in which observation room the aviator or commander of the ship will be stationed to direct the movement of the ship, said shaft H also serving as an air-duct to supply the engine-room with fresh air when all other means of supplying fresh air thereto are closed, and it, furthermore, serves as a duct to carry off hot air and the products of respiration of the persons occupying the ship, it being made of ample diameter and having a step-ladder 22. Fig. 21 by means of which the observation room 21 is reached. The mechanism for upwardly propelling this airship comprises four hemispherical shells I, K, L, and M, of which the shell I is located forward of amidship and on the port-side thereof while the shell K is forward on the starboard side; the shell L is located on the port side abaft of the ship, and the shell M abaft and on the starboard side. These shells form an integral part of the ship, being open on the bottom and their edges hermetically secured to the floor J, of the engine-room E which floor is even with the lower longitudinal edges of the ship's body. These hemispherical shells I, K, L, and M, and the machinery located therein are exact duplicates, and I shall, therefore, describe their specific construction in the singular number. In this shell there are formed spiral corrugations 23, Figs. 18, 19, and 23, one member, 24, of said corrugations being approximately horizontally, and the other member, 25, approximately vertically disposed. In this shell there is located a cylindrical shell 26, which shell reaches upwardly to within a suitable distance of the apex or crown 27, of said shell, said cylinder, as I shall hereafter term this cylindrical shell 26, being supported in said shell by a number of supporting-bars 28, radially traversing the open space of said shell. This cylinder 26 is open on both ends, and within it there are permanently affixed a series of spirally-wound baffle-plates 39, of which there may be any suitable number, four being shown in Fig. 23ª, the function of which will hereinafter be fully described.

In the space between the cylinder 26 and the inner surface of the shell there is located a wind-wheel P, which wind-wheel comprises a number of helical fan-blades 29, which are secured to a skeleton or cage, which consists of upper and lower circular bands 30 and 31, Fig. 23, and middle-band 32, and a suitable number of connecting-bars 33, all properly secured together to afford a firm and substantial support to the fan-blades 29.

In the cylinder 26, and below the spirally-wound baffle-plates 39 there are located a series of inclined slats 34, the slats on one side of the center line of the cylinder being inclined in one direction, and those on the other side of said center line being inclined in the opposite direction. These slats serve as inclined aeroplanes and they are inclined in opposite directions to equalize the effect of the air entering the shell, as will be further on referred to. Below the inclined slats there is located a yoke O, which is formed, preferably integral, with a bar 35, said yoke being approximately in the center line of the cylinder 26, and the bar 35 reaching from said yoke radially to the inner edge of the shell, where it is secured to a carrier 36, Fig. 23, there being a tubular bar 37, radiating from the opposite end of said yoke O, and reaching to the opposite inner side of said shell. In this latter tubular bar 37 there is a shaft 38, carrying on its end which terminates in the yoke O, a bevel-wheel 40, meshing with a similar bevel-wheel 41. This latter bevel-wheel is mounted upon the lower end of a vertically-disposed shaft 43, which shaft revolves in a tubular member 44, formed, preferably integral, with the yoke O. The upper end of this tubular member 44 has a ball-bearing 45, to carry the skeleton or cage heretofore described, the shaft 43 being squared at 48 near its upper end to engage the spider comprising the upper bars 41× of said cage, in a positive manner. Above this spider there is located upon the shaft 43 a collar 49, to which a lubricator R, is affixed, which lubricator is designed to lubricate the revolving parts of the vertically-arranged mechanism in the hemispherical shell. The upper end of the vertical shaft 43 is sustained in a bearing 50, located in the dome 27 of said shell.

On the outer surface of the hemispherical shell there is located a bearing 51, which sustains the tubular member 37, and which forms a stuffing-box 52, and which constitutes a bearing for the shaft 38, and prevents water from entering the engine-room E, when the airship is afloat upon water and sufficiently immersed to reach the said shaft 38. On the inner end of this shaft 38 there is secured a bevel-wheel 53, meshing with a bevel-wheel 54, which bevel-wheel is secured upon a shaft 55, journaled in suitable bearings 56 and 57, Figs. 6 and 8.

In the engine room E there are located four friction-clutch devices S, T, U, V, Fig. 3, of which said shaft 55, of which there are also four is a member and since these four friction devices are all alike, I shall also describe these devices in the singular number.

Upon the shaft 55 there is mounted a combined sprocket-wheel and friction-clutch disk 58, having friction-bars 59, of usual construction. Upon this shaft 55 there is also splined a sliding, tapering clutch-sleeve 60, adapted to engage the friction bars 59 when laterally moved upon the shaft 55, by a forked lever 61. This lever is fulcrumed upon a standard 62, Fig. 5, and it engages with its outer end a cam-groove 63, located in a cam-disk 64, which cam-disk is mounted, and oscillates upon a standard 65. This cam-disk 65 is formed, preferably integral, with a rope-sheave 66, the object of which will later on appear. To this rope-sheave 66 is secured a stud 67, which is engaged by a rod 68, upon which there is located a spiral spring 69, said rod 68 passing through a swiveling bearing 70, journaled upon a standard 71, said spiral spring 69, bearing against said swiveling bearing 70 with one end, and against a collar 72, on the rod 68 with its other end.

From the ceiling 73, Fig. 6, is suspended a hanger 74, from which is in turn suspended a device which I shall hereinafter term the equilibrium mechanism W, and which comprises, as shown in Fig. 6, a pendent rod 75, of X-shape in transverse section, said rod being jointed to the hanger 74 by a link 76 which link functions similar to a gimbal-joint and permits the rod 75 to swing freely in every direction. To the lower end of this rod 75 there is secured a casing 77 having brace-rods 78, as illustrated in detail in Fig. 7. In this casing 77 there is a movable weight 79, which is in screw-threaded engagement with a screw-threaded rod 80, having on its outer ends crank-handles 81, by which said screw-threaded rod 80 may be rotated. This weight 79 is guided on a rod 82, and carried by a wheel 83, revolving upon a track or rail 84 to relieve the screw 80 from the strain of said weight 79. This weight 79 is moved longitudinally in the casing 77 and its object is to shift the center of gravity of the pendulum rod 75 forward or backward as the case may be.

Upon the rod 75 there is a sliding block 85, having four lugs 86, to which are pivoted double-eyes 87, to each of which a rope is secured. There are four of these ropes 88, 89, 90, and 91, the rope 88 leading to the sheave 64 of the forward port friction clutch mechanism S, rope 89 leading to the forward starboard friction clutch mechanism T, while rope 90 leads to the rear port friction clutch mechanism U and rope 91 to the rear-starboard friction clutch mechanism V. On the sliding block 85 there are eyes, 92, to which ropes 93 are secured, which ropes terminate in a single rope 94, which latter rope is wound upon a winch X, as clearly illustrated in Fig. 6.

The operation of this equilibrium-maintaining device, as well as the operation of the four vertically lifting devices in the hemispherical shells I, K, L, and M, is as follows: Assume that all the clutches S, T, U, and V, are thrown in operative connection with the shafts 55 to cause them to rotate, which is their normal position when the airship is upon an even keel, that is to say: horizontal in both, its longitudinal as well as transverse directions. If now the motors F are started, the main shaft 16 will rotate the four shafts 55 by sprocket-wheels 95 thereon, connecting with the sprocket-wheels 58 by link-belting 96, and through the gear-wheels 54 and 53, and the mechanism already described located in the hemispherical shells, rotate the latter mechanism which will cause the airship to rise vertically, the airship remaining in a horizontal position and the weight 79 in the casing 77, in the middle position in said casing 77. When it is desired to cause the airship to rise with its bow slightly elevated, the weight 79 in the casing 77 is moved backwardly of the center of the said casing which will cause the pendulum to change its perpendicular position and the cords or ropes 90 and 91 to rotate the cam-disks 64 in the friction clutch devices U and V, and to move the clutch-members 60 slightly outwardly thereby releasing the clutch-disks 58 slightly, and in consequence thereof the rearwardly-located lifting-mechanism in the hemispherical shells L and M to rotate slightly slower. The lifting mechanism in the shells I and K rotating the fastest, the bow of the air-ship will rise.

When it is desired to descend or to depress the bow, the weight 79 in the case 77 is forwardly moved, as shown in Fig. 7 which will cause the pendulum to move slightly rearwardly and thereby the ropes 88 and 89 to rotate the clutch-disks in the friction-clutch devices S and T and to slacken the speed of the vertically-lifting mechanism in the hemispherical shells I, K, as already described with reference to the mechanism in the hemispherical shells L and M thereby making the lifting mechanism in the shells L and M more powerful and thus causing the stern of the airship to rise. Again, assume the airship to be floating in air on an even keel and the weight 79 to be in the center of its casing 77 which is its normal position. Should a current of air acting upon the air-ship on its port side, as illustrated in Fig. 26 and the airship list to starboard, the pendulum 77 remaining perpendicular, the ropes 88 and 90 will cause the rotation of the cam-disks in the friction-clutch devices S and U thereby making the mechanism in the hemispherical shells K and M the more powerful and thus cause the airship to return to its even keel, while if the wind acting upon the starboard side of the airship, as shown in Fig. 27, causes the airship to list to port, a contrary movement will take place and the mechanism in the hemispherical shells I and L to be the more powerful and cause the airship to resume its horizontal position. It will thus be seen that this action of the equilibrium-maintaining mechanism is entirely automatic and that its action upon the vertically-lifting devices is to cause a reduction of speed in the respective lifting devices, and an increase in speed of the other lifting devices.

When the friction clutch disks are rotated by the ropes revolving the same, they are returned to their normal position by the springs 69, as soon as the pendulum or rod 75 with its appurtenants resumes, as it were, its perpendicular position, it being understood that the pendulum moves, figuratively speaking, in the same sense as the sun moves from east to west.

Having thus described the mechanism which causes the ship to rise, I shall now describe the mechanism by which the ship is caused to descend. As already stated, the block 85 is suspended upon the pendulum rod 75 by the ropes 93 and 94 and the winch X. When it is desired to descend gradually this winch is operated so as to cause the block 85 to descend, which will cause all the friction clutch devices S, T, U, V, to slacken speed by pulling the four ropes 88, 89, 90 and 91, and when it is desired to stop the motion of the vertically lifting devices, the block 85 is lowered until all the clutch-members 60 have been disengaged from the sprocket-friction disks 58, such a position being indicated in dotted lines in Fig. 6. It will now be also observed that the vertically-lifting devices, which for convenience, I shall hereafter term the cyclone-producers, can be stopped and started by manipulating the winch X without interfering with the motors F, a matter to which I shall again allude.

The mechanism by which this airship is forwardly and backwardly propelled includes two, independently operative means, viz., a pair of side-propellers, and a stern propeller. The side-propellers, illustrated in Figs. 1, and 21 and in detail in Figs. 11, 12, and 13, comprise two fan-wheels Y and Z, of which the fan-wheel Y is located amidship on the port side, and Z, amidship on the starboard side, both wheels, as well as the mechanism by which they are rotated, being duplicates and I shall, therefore, describe their specific construction in the singular number.

The fan-wheel Y is of any approved construction suitable for airship propulsion. It is mounted upon a horizontal shaft 97 running parallel with the sides of the airship, and revolving in bearings 98, located on suitable brackets 99, having ample braces 100, thereby producing a comparatively light, yet very stiff and substantial support for said fan-wheel Y. Upon the shaft 97 there is a bevel-pinion 101, meshing with a bevel-wheel 102 fastened to a short transverse shaft 103, which passes through the side-wall of the airship into the engine-room E, it being carried in suitable hangers 104, and bearings 105, as clearly illustrated in Fig. 13. This shaft also carries sprocket-wheels 106, which connect, by means of link-belts 107 with a second set of sprocket-wheels 108, there being two sets of these sprocket-wheels and link-belts to guard against possible interruption by accident to one or the other set of these driving mechanisms.

The sprocket-wheels 108 are secured to a transverse shaft 109 mounted in bearings 110, 111, and 112, and it carries on its inner end a bevel-gear wheel 113, which engages a similar bevel-gear wheel 114, secured to the main transmission shaft 16. Upon the shaft 109, and preferably formed integral with the bevel-gear wheel 115, there is a bevel-gear wheel 115, and in proximity of this bevel-gear wheel 115 and facing the latter, there is a further bevel-gear wheel 116, while an intermediate gear-wheel 117 engages the two gear-wheels 115 and 116 and constitutes therewith a reversing gear of the well-known type. The two bevel-gear wheels also constitute friction disks, there being in said gear-wheels friction bars 59, the same as heretofore described with reference to the friction clutch mechanism shown in Fig. 5. Upon the shaft 109, and located between the bevel-gear wheels 115, 116, there is splined a clutch-block 118, which has two tapering ends, so as to engage either the gear-wheel 115 or 116, it being laterally moved by a forked lever 119 fulcrumed upon a suitable standard 120. This lever 119 may be connected, by a rod 121, with a similar lever 122 located upon a platform 123, Fig. 6, upon which platform all the levers and means for manipulating the various mechanisms are concentrated to permit their operations and handling being accomplished from a central station. This platform 123 may be provided with suitable railings 124, for obvious reasons. It will now be observed that there are two propellers, and two sets of mechanisms for operating the same, the one just described with reference to the side-propeller Y being located on the port side of the ship while a duplicate set is located on the starboard side of the ship to rotate the side-propeller Z. The fans of these propellers Y and Z are inclined in opposite directions, and are, therefore, also rotated in opposite directions it being a well-known fact that the action of a propeller wheel is a compound one, that is to say, propelling the ship forward and backward and also causing a sidewise movement which sidewise movement, however, is neutralized by the propeller blades inclining in opposite direction. To move the ship forward the clutches upon the shaft 109 are caused to engage one of the clutch-disks, say 115, (depending upon the direction of rotation of the main transmission shaft 16, and also whether the respective propeller wheels are "right" or "left,") while to cause the ship to back up, the levers 119 are moved in the opposite position to cause the friction-clutch 116 to rotate the shafts 109 in an obvious and well-understood manner.

The mechanism which comprises the stern-propeller Q, Fig. 17 includes a hemispherical, spirally corrugated, shell 125, Figs. 17, and 18, located in a recess 126, centrally in the stern of the airship. In this hemispherical shell, which has its spiral corrugations 23, 24, arranged precisely the same as those described with reference to the shells I, K, L, and M, there is a central shaft 127, passing centrally through said hemispherical shell, there being a stuffing-box 128 to prevent water from entering the ship at the stern should the ship, when afloat upon the seas in rough weather, stamp or roll so much as to submerge the stern deep enough to cause water to reach said shaft 127.

In the interior of the hemispherical shell 125 there is a cylinder 226, in which there is a propeller-wheel N, and below this propeller-wheel there are inclined slats 234, and I may, should I consider it advisable, provide this shell 125 with a fan P secured to a cage comprising the circular bands 30, 31, and 32, with their connecting-bars 33, the same as the shells I, K, L, and M, so that it will not be necessary to further describe these parts. There is also a spider 228 in said shell Q, to which the cylinder 226 is secured, there being in said spider 228 a central bearing 129, to sustain the outer end of the central shaft 127.

As illustrated in Fig. 17, there are two sprocket-wheels on the inner end of the stern-shaft 127 which connect with the main transmission shaft 16, and sprocket-wheels 131 by link-belts 132. In order to reverse the stern-propeller, there is located in the engine-room a reversing-gear including two, oppositely-facing bevel-gear wheels 133, 134, Fig. 9, and an intermediate bevel-wheel 135, suitably journaled in a standard 136, there being a splined clutch-member 137 between said bevel-gear wheels 133 and 134, operated by a forked lever 138, which lever 138 is connected with a similar lever 140 located upon the platform 123, by a rod 139, so that the stern-propeller may be started, stopped, and reversed by said lever 140.

In order to properly strengthen and stiffen the ship's body, the same is fitted with ample, longitudinally, and transversely - disposed bulkheads 151, Fig. 2, so as to divide the ship into a large number of gas-cells A', each of which is supplied with suitable means, not shown, for filling the same with hydrogen gas; and in order that the stern-shaft 127 may be reached when necessary, without entering a gas-cell, the said shaft is located in a tube 152, while the sprocket-wheels 130 and 131 and the link-belts 132 are located in a vertical tube 153, which latter tube connects with the tunnel 17, thereby affording means for reaching all the mechanism to which access must be had for inspection, repairs, and other obvious purposes.

The bottom of this airship afore and abaft the engine room is constructed of a series of inclined planes B, acting as aeroplanes and in order to provide for cooling-means for the internal-combustion motors F, I construct a number of these aeroplanes B, with double walls 154, 155, as shown in Figs. 20 and 28, so as to afford narrow, intercommunicating, water-spaces 156 therein, and carry the water-supply, and return pipes 157, 158, from the gasolene-motors F, forwardly, the supply-pipe 157 passing from the motors to a tank 159 and thence forward to the first section B' of the water-cooling system, while the return-pipe 158 leads from the last of the sections of the water-cooling system back to the engines F. The tank 159 is located above the water-cooling system of the inclined planes in order that the entire system may at all times be completely filled with water, the tank 159 containing a surplus of water. This tank is necessary for the reason that should the water in the cooling system become low, by leakage, evaporation &c., and the airship rock, the water in the system would shift ballast (as it were, using a nautical term for this occurrence,) and thereby make the listing side of the ship heavier, and hence more difficult to bring the ship upon an even keel. The tank is further necessary since, should the several sections of the cooling system not be entirely or nearly entirely full, there would not be an intercommunication between the successive sections of the cooler. As arranged the hot water from the engines F enters the farthest section, thence passes upwardly to the second section and so on until when reaching the last cooling section, the water has become cold by radiation and is returned to the engines F by means of a properly constructed circulating pump 165, Fig. 20. And in order to increase the heat-conductivity of the cooling section as much as possible, I furnish the inclined surfaces 154 with thin strips of metal 160, projecting at right angles from said surfaces 156. This water-cooler system as well as the gasolene tank G are located forward of the engine-room in order to properly distribute the weight of the accessories in the ship's body, the abaft-portion of the airship being the heavier owing to the long main transmission shaft and the stern-wheel therein, which will be counter-balanced by the weight of the water-cooling system and the gasolene tank located well forward in the airship.

In order that the airship may be thoroughly anchored upon ground when at rest, or during a storm, I provide the same with a series of rearwardly-inclined, resilient, legs 161, which legs are comparatively thin bars of preferably spring-temper, and which are secured to the ground by screw-shaped anchors 162. In case of a storm, I also turn the head D downwardly, so that a reverse inclined plane 163, Fig. 1 results which has a tendency to hold the bow of the ship down when the wind is blowing head-on. When the wind is blowing stern-on, the stern will be held down owing to its curved shape.

To admit light to the engine-room I provide the outer longitudinal walls of the airship with a number of windows 164, Figs. 1, 2, and 22, which windows may be hermetically closed when required, by any suitable constructive means, and left open to admit air and provide for proper ventilation, when the conditions of the atmosphere allows their being open.

To manipulate the airship, the commander is stationed in the observation-tower 21 and he communicates his directions to the operator or operators in the engine-room E by any suitable means. To cause the ship to rise vertically, the four cyclone-producers are started, (after the motors F have been started,) by manipulating the winch X, while if the ship is to rise slantingly, the weight 86 in the pendulum-device is shifted accordingly and then all the wind-wheels caused to revolve as already described. When it is desired to come about, the clutch-mechanisms shown in Fig. 14 are manipulated to cause one or the other of the side-propellers Y, Z, to rotate slower, or, if necessary, the movement of the proper side-propeller is reversed, which latter manipulation will bring the airship about in the shortest space of time.

The air drawn into the hemispherical shells by the fans P passes first through the interstices between the inclined slats in the cylinders, and the helical baffle-plates therein, thereby tending to lift the ship, in the case of the cyclone-producers, or to push the ship forward as is the case with the stern-propeller; it is then passed along the helical corrugations, one member of which is horizontally disposed and thus further assists in lifting or pushing the ship forward, as the case may be.

The passengers which are to be carried in the ship, will occupy the space or saloon C' located aft of the engine-room E, the door 19 leading into this saloon, while another door, 166, Fig. 2, leads from the saloon to the engine-room. These two doors may be hermetically sealed when necessary, and the passengers confined in the engine-room where they are protected from the inclemencies of weather, said engine-room being always warmed or heated by the heat radiated by the engines F. When the weather permits, the passengers may occupy a gallery D' located aft of the saloon C', which gallery is constructed of open lattice-work and has an open lattice-work floor through which the earth may be observed.

When the ship is afloat upon water the side-propellers and the stern propeller are operated only, the cyclone-producers remaining inoperative. These side-propellers and the stern propeller are located high enough so as not to operate in or touch the water, the progress of the ship being, accordingly slower than when moving in air, but sufficient to answer all reasonable requirements and the ship is steered by manipulating the side-propellers in the proper manner. To cause it to rise from the water, the cyclone-producers, or vertically-lifting mechanisms are set in motion, as already described. I will here also state that I shall install in this ocean-airship, if found desirable, suitable electric-dynamos for operating the sparking mechanism of the internal combustion motors and that I may also install electrical illumination in the engine and the passenger rooms so that these rooms may be properly lighted during night, I shall also install all the physical and nautical instruments necessary for taking observations of positions, altitude, and other purposes, such details being within the province of the skilled mechanics and engineers intrusted with the construction of this ocean-air ship, and the experienced navigators of the air and the seas.

It will now be observed that by the peculiar construction of this ocean-airship, and the novel combination of mechanism, I secure all the objects and attain the results set forth in the introductory clauses to this specification.

I have heretofore stated that the hemispherical sheel 125 at the stern of the airship is spirally corrugated and that in the space between the cylinder 226 and the inner surface of the said sheel 125, there is a fan-wheel P. This construction may, however be varied by omitting the fan-wheel P. In this case I may also dispense with the spiral corrugations of the hemispherical sheel 125, for the reason that without the fan-wheel P these spiral corrugations are of comparatively small service.

Having thus fully described this invention, I claim as new and desire to secure to me by Letters Patent of the United States—

1. An ocean-airship comprising a body adapted to hold gas in gas-tight cells, said body being of substantially semi-circular transverse section and having an independent, pointed, head, said head being hinged to said body at the forward end; means for raising and lowering said head; a series of means for propelling said body, said means being adapted to operate independently of one another, and aeroplanes projecting from the lower side of said body, said aeroplanes being hollow bodies adapted to hold gas, the walls of said aeroplanes forward of the ship being double walls to afford water-spaces, as described.

2. An ocean-airship comprising a body adapted to hold gas in gas-tight compartments therein, said body being substantially semi-circular in transverse section; a series of approximately hemispherical shells in said body, said shells having spirally corrugated walls, one member of said spirals being approximately horizontal and the other substantially vertical; a fixed cylinder in said shell; a series of spiral fans surrounding said cylinder; a series of fixed, spirally arranged baffle-plates in said cylinder; means for rotating said spiral fans, and a series of inclined slats below the spiral baffle-plates said slats inclining in opposite directions, as specified.

3. An ocean-airship comprising, in combination, a body adapted to hold gas in gas-tight compartments therein, a series of vertically-lifting propellers, and automatic means for maintaining the air-ship upon an approximately even keel, said means including a series of friction-devices; a pendulum; means connecting said pendulum with said friction-devices whereby the movement of said pendulum is communicated to, and adapted to govern the rotative speed of, said friction-devices, said friction-devices being adapted to govern the rotative speed of said vertically-lifting propellers, and means for independently rotating said friction-devices.

4. An ocean-airship comprising, in combination, a body adapted to hold gas in gas-tight compartments therein, a series of vertically-lifting propellers, and automatic means for maintaining the air-ship upon an approximately even keel, said means including a series of friction-devices, a pendulum; means connecting said pendulum with said friction-devices whereby the movement of said pendulum is communicated to, and adapted to govern the rotative speed of, said friction-devices, said friction-devices being adapted to govern the rotative speed of said vertically-lifting propellers; means for independently rotating said friction-devices, and means on said pendulum for shifting the center of gravity of said pendulum.

5. An ocean-airship comprising, in combination, a body adapted to hold gas in gas-tight compartments therein, a series of vertically-lifting propellers, and automatic means for maintaining the air-ship upon an approximately even keel, said means including a series of friction-devices, a pendulum; means connecting said pendulum with said friction-devices whereby the movement of said pendulum is communicated to, and adapted to govern the rotative speed of, said friction-devices, said friction-devices being adapted to govern the rotative speed of said vertically-lifting propellers, and means for independently rotating said friction-devices, said friction-devices including a cam-disk, a lever, a friction-disk and a clutch-member, said clutch-member being connected with said cam-disk and operated by the rotation of said cam-disk.

6. An ocean-airship comprising, in combination, a body adapted to hold gas in gas-tight compartments therein, a series of vertically-lifting propellers, and automatic means, for maintaining the airship upon an approximately even keel, said means including a series of friction-devices, a pendulum; means connecting said pendulum with said friction-devices, and means for independently rotating said friction-device, said friction-devices including a cam-disk, a lever, a friction-disk and a clutch-member, said clutch-member being connected with said cam-disk and operated by the rotation of said cam-disk, there being means on said cam-disk for returning it to its normal position.

7. In an airship, means for maintaining the ship upon an approximately even keel said means including, in combination, vertically-lifting propellers; a pendulum-rod; a universal-joint from which said pendulum-rod is suspended, a block, movable upon said pendulum, a casing at the lower end of said rod; a movable member in said casing; a series of friction-devices connected with said block, and means for moving said block upon said pendulum-rod said friction devices adapted to govern the speed of said vertically-lifting propellers.

8. An ocean-airship including in combination, a body adapted to hold gas in gas-tight compartments therein, side-propellers; means for operating said side-propellers independently of each other; a stern-propeller; means for operating said stern-propeller independently of the side-propeller; means for reversing the rotation of the side-propellers and the stern-propeller independently of one another; a series of four lifting propellers, said lifting propellers being rotative independently of one another either in series or singly, and means for automatically controlling the rotation of said lifting-propellers.

9. In an airship the combination, with a body adapted to hold gas in gas-tight compartments therein, an internal-combustion motor in said body, means for cooling said internal-combustion motor, said means comprising a series of hollow, inclined planes located on the under side of the body forward of the engine-room and adapted to receive water; a pipe connecting said hollow inclined planes with said motor; a return-pipe leading from said hollow, inclined planes back to said motor, and a supply-tank above said hollow, inclined planes and adapted to contain a surplusage of the cooling-water from said hollow, inclined planes, as specified.

In testimony that I claim the foregoing as my invention, I have hereunto set my hand in the presence of two subscribing witnesses at Newell, Iowa, this 6th day of August, 1909.

REINHOLD SCHMIECHEN.

Witnesses:
  N. F. MADISON,
  J. H. WILLIAMS.